United States Patent [19]

Imamura et al.

[11] Patent Number: 5,781,741
[45] Date of Patent: *Jul. 14, 1998

[54] MESSAGE COMMUNICATIONS SYSTEM IN A PARALLEL COMPUTER

[75] Inventors: Nobutaka Imamura; Hiroaki Ishihata, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 496,781

[22] Filed: Jun. 29, 1995

[30] Foreign Application Priority Data

Jun. 29, 1994 [JP] Japan .................................. 6-147370

[51] Int. Cl.$^6$ .......................... G06F 15/16; G06F 13/38
[52] U.S. Cl. ................ 395/200.66; 370/353; 395/200.37
[58] Field of Search ................... 395/200.12, 182.02, 395/182.11, 877, 250, 200.15, 800, 620, 182.09, 497.02, 200.37, 200.66, 200.7, 200.62, 557; 370/218, 422, 392, 395, 227, 217, 228, 352, 127, 380; 340/825.7; 364/DIG. 1, DIG. 2

[56] References Cited

U.S. PATENT DOCUMENTS

| | | | |
|---|---|---|---|
| 4,590,554 | 5/1986 | Glaser et al. | 395/182.11 |
| 5,047,917 | 9/1991 | Athas et al. | 395/877 |
| 5,161,156 | 11/1992 | Baum et al. | 395/182.02 |
| 5,402,417 | 3/1995 | Aramaki | 370/392 |

*Primary Examiner*—Daniel H. Pan
*Attorney, Agent, or Firm*—Staas & Halsey

[57] ABSTRACT

A method for message communications between multiple processor elements in a parallel computer according to this invention comprises the steps of: directly writing a message body containing message information of a message from a transmitting processor element into a shared memory area in a memory of a receiving processor element by a remote writing unit; transmitting a header containing identifier information and pointer information for the message from the transmitting processor element to a message receiving unit of the receiving processor element; and writing the header into a local memory area in the memory in the order of arrival of the headers by the message receiving unit of the receiving processor element.

23 Claims, 9 Drawing Sheets

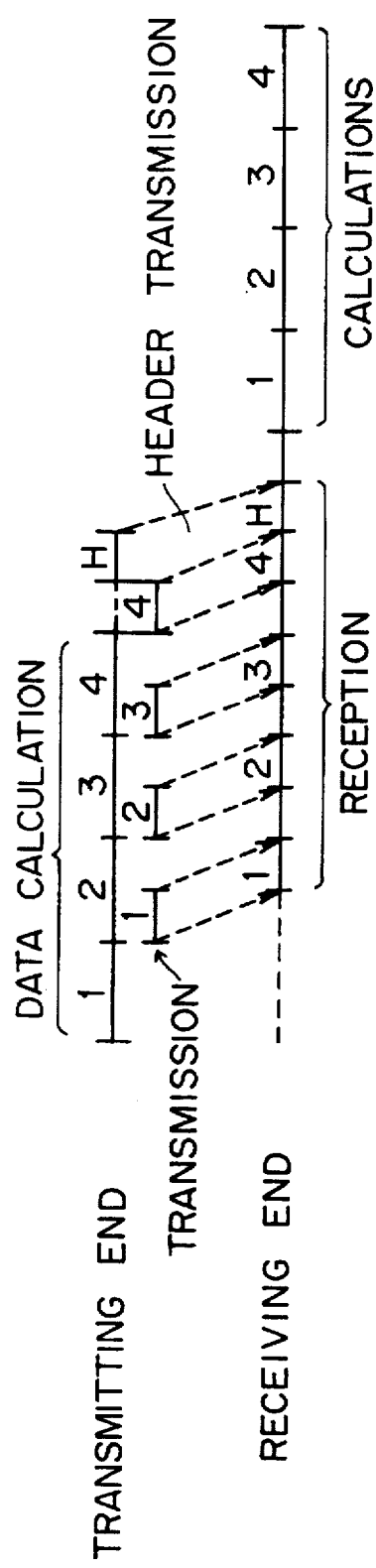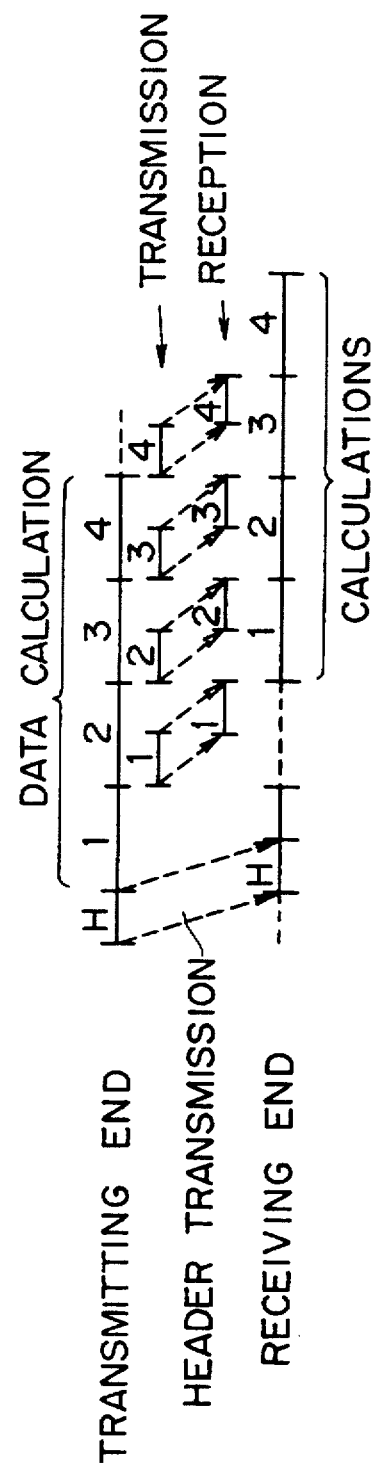
Fig. 10A
Fig. 10B

MESSAGE COMMUNICATIONS SYSTEM IN A PARALLEL COMPUTER

BACKGROUND OF THE INVENTION

1. Field of the Invention

The present invention relates to a message communications system in a parallel computer, and more particularly to a message communications system which permits flexible buffer control and a reduction in overhead.

2. Description of the Related Art

In a parallel computer, which is comprised of multiple processor elements, data is divided and stored across the multiple processor elements. At the time of message communications in such a parallel computer, therefore, each processor element performs computational processing while using data stored in other processor elements. In order to increase data processing efficiency in the parallel computer, enhanced message communications efficiencies have been desired.

Conventionally, two methods have been used for message communications in parallel computers: the first method uses hardware for message communications, and the second method allows multiple processors to share memory and implements message communications by software. The second method is widely used in parallel computers that use shared bus connection.

FIG. 1 shows a message communication system using the first method described above.

In the first method, a transmitting processor element attaches a header to a message and then sends the message to a receiving processor element through a network by a transmitting device. The receiving processor element receives the message by a receiving device and writes it into a buffer in a memory. The receiving processor element then searches through messages in the buffer for a desired message according to a receiving function. The message searched for is transferred to an user's receiving area, thereby completing message communications. Here, the header means data including routing information from the transmitting processor element to the receiving processor element, including an identifier used by the receiving processor element for a message selection.

In this method, since the receiving device stores received messages from the start of the buffer in the order of receiving the messages, the sequence of messages transmitted from processor elements is maintained.

FIG. 2 illustrates a message communications system using the second method.

In the second method, a transmitting processor element reserves a buffer on a shared memory and writes a message into the buffer by a remote write device. The address and the header of the message are entered into a message queue on the shared memory. Then, a receiving processor element searches the message queue for the header of a desired message and transfers the body of the message identified by the header to the user's receiving area, thereby completing message communications.

In this method, since exclusive control is carried out when the address and the header are written into the message queue, the sequence of messages transmitted from processor elements can be maintained.

In the first method, however, since the receiving device has to perform not only buffer control but also message writing, flexible buffer control cannot be attained. If a long message is partitioned into smaller portions for transmission, the first method needs complex circuitry for the communication in the receiving device. In addition, when a new buffer is required for a message communication requested by an operating system (OS) or an application program, the system according to the first method can not meet such a requirement. It is possible to generate an interruption in the receiving device, and reserve a buffer by the CPU using a DMA (dynamic memory access) process. However, this technique causes more serious problems in that the latency in message communications (time delay between the start of transmission and the start of reception) increases, and the speed of the message communication decreases, thereby reducing the quality of the message communications.

On the other hand, in the second method, since exclusive control has to be carried out for message queuing, the overhead is increased. Further, according to the exclusive control, processor elements that are requesting queuings other than a processor element that is in the queuing process, must be in an idle state.

Such problems according to the second method do not arise in the first method, because even if message congestion occurs, it is message communications hardware that is placed in the idle state, and processor elements can execute other jobs.

SUMMARY OF THE INVENTION

It is therefore the object of the present invention to provide a method and a system for a message communications in a parallel computer which realizes flexible buffer control and a reduction of overheads.

A method for message communications between multiple processor elements in a parallel computer according to the present invention includes the steps of: directly writing a message body containing message information of a message from a transmitting processor element into a shared memory area in a memory of a receiving processor element by a remote writing unit; transmitting a header containing identifier information and pointer information for the message from the transmitting processor element to a message receiving unit of the receiving processor element; and writing this header into a local memory area in the memory in the order of arrival of the headers by the message receiving unit of the receiving processor element.

A parallel computer in which message communications are performed between processor elements according to this invention, comprises: a processor element comprising a remote writing unit directly writing a message body containing message information of a message into a shared memory area in a memory of another processor element, and a message transmitting unit transmitting a header containing identifier information and pointer information for the message to the other processor element. The other processor element comprises a message receiving unit writing the header into a local memory area in the memory in the order of arrival of the headers.

According to the present invention, since buffer control for messages transmitted and a process of maintaining the order of the messages are performed separately, flexible buffer control can be realized. Further, since software-based exclusive control is not needed, overheads in message communications and the idle time in the processor elements are reduced.

A receiving processor element according to this invention can gather identifier information for messages at short intervals or at regular intervals, thus, fast retrieval of messages can be realized. Further, since a writing area for messages can be controlled by the transmitting processor element, the latency in message communications can be reduced and high speed processing for a concentration of messages at the receiving end can be realized.

Furthermore, according to the present invention, since a message can be partitioned into portions before transmission and a header does not need to be attached to each of the portions, a large message can be transmitted without occupying the network for a long time. A high-priority message that is generated subsequently can be transmitted without waiting for a long time. At the transmitting end, the message creating time can be overlapped with the message transmitting time, and the message creating time and message transmitting time at the transmitting end can be overlapped with the message receiving time and message processing time at the receiving end. This will considerably reduce the message transmission time.

BRIEF DESCRIPTION OF THE DRAWINGS

FIGS. 10A and 10B are diagrams for use in explanation of a message communications method by the parallel computer of the present invention.

DESCRIPTION OF THE PREFERRED EMBODIMENT

Figure 1:
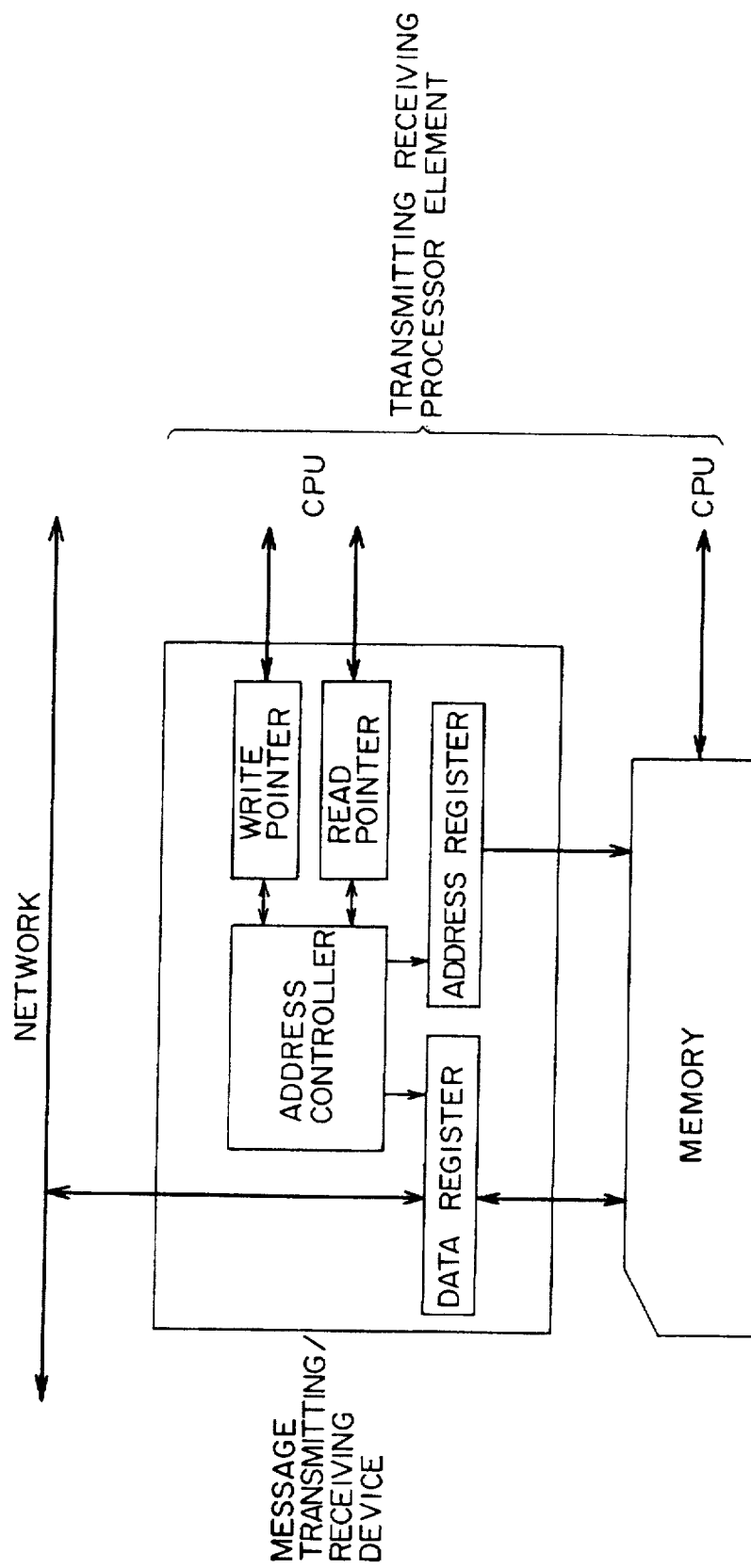
FIGS. 1 and 2 are diagrams for use in explanation of conventional message communications.
Figure 2:
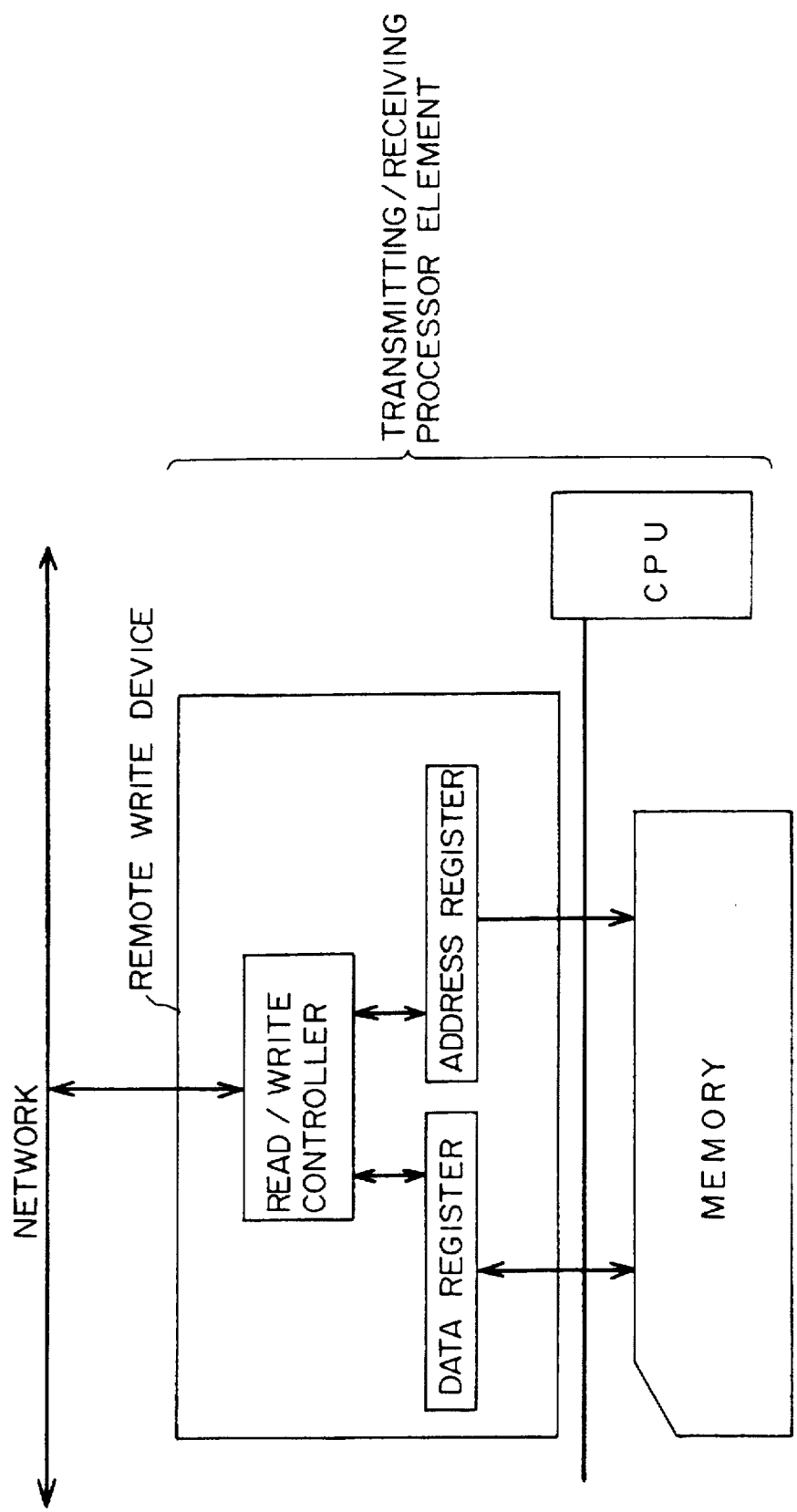
Figure 3:
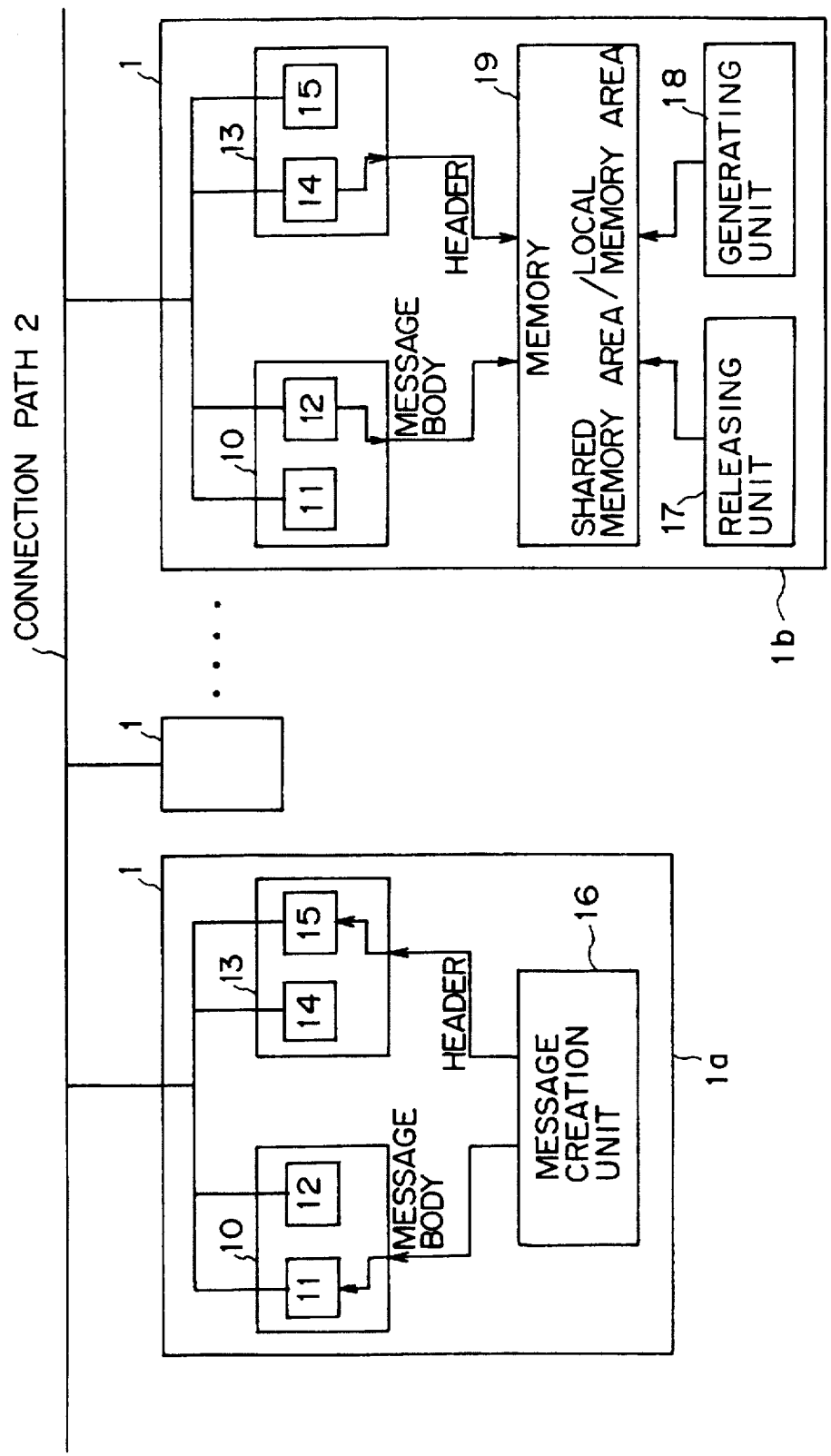
FIG. 3 shows a configuration of a parallel computer of the present invention.

FIG. 3 shows a configuration of an embodiment of a parallel computer according to the present invention. The parallel computer of the present embodiment comprises a plurality of processor elements 1 and a connection path 2, such as a bus or network, interconnecting the processor elements 1. Each of the processor elements is equipped with message transmitting and receiving facilities. Here, a processor element that transmits messages and a processor element that receives messages will be referred to as a transmitting processor 1a and a receiving processor 1b, respectively, for the sake of convenience. In the transmitting processor 1a, components required for transmission are illustrated, but components such as a releasing unit 17, a generating unit 18, etc., are omitted for simplicity. Also, in the receiving processor 1b, components required for reception are illustrated, but components such as a message creating unit 16, etc., are not illustrated.

Each of the processor elements 1 comprises a remote memory controller 10, a message communications circuit 13, and a memory 19. The memory 19 is located locally in each processor element, but it also functions as a distributed shared memory. The memory 19 has a shared memory area which functions as a shared memory accessible by a plurality of other processor elements and a local memory area which functions as a local memory inaccessible by the other processor elements. The shared memory area can be formed in a memory located outside the processor element 1. The remote memory controller 10 of each processor element is equipped with a remote write unit 11 and a receive write unit 12. The remote write unit 11 writes the body of a message directly into the shared memory area in another processor element, and the receive write unit 12 writes the body of a message sent from the remote write unit of another processor element into the shared memory area in the corresponding processor element. Here, the "message body" indicates data having message information other than a header, and the "header" indicates data including message identifier information and pointer information for the body of a transmitted message.

The message communications circuit 13 comprises a message receiving unit 14 and a message transmitting unit 15. The message receiving unit 14 writes headers of messages sent from other processor elements into the shared memory area or the local memory area in the corresponding memory 19 in the order of arrival of the headers, and the message transmitting unit 15 transmits the header of a message to the message receiving unit 14 in another processor element.

The processor element 1 further comprises a message creating unit 16, a releasing unit 17, and a generating unit 18. The message creating unit 16 creates messages to be sent to the other processor elements. The releasing unit 17 releases a write area in the memory 19 to be written with messages sent from the remote write unit 11 of the transmitting processor element 1a, according to a request from the transmitting processor element 1a. The generation unit 18 generates a new write area according to a request from the transmitting processor element 1a when the write area for messages from the transmitting processor element 1a has become full. The operations of the releasing unit 17 and the generation unit 18 based on the requests of the transmitting processor element are controlled by the software of an operating system, or the like.

When, in the transmitting processor element 1a, a message is created by the message creating unit 16, the remote write unit 11 writes the message body (the message information portion other than the header of the message) into the shared memory area in the memory 19 of the receiving processor element 1b. At this point, the message transmitting unit 15 transmits to the message receiving unit 14 of the receiving processor element 1b the header including message identifier information and pointer information for the message body.

When message bodies are thus written directly into the shared memory area in the memory 19 of the receiving processor element 1b, the sequence of the message bodies is assured by the identifier information sent to the message receiving unit 14. Note that the amount of data required for the identifier information is less than that for the message body. After that, the message body is read out from the memory 19 according to the pointer information corresponding to the identifier information specified by the data processing function, which is not shown in the Figures, of the processor element 1.

Thus, according to the present invention, the buffer control for message bodies and the message sequence assurance facility can be separated from each other for message communication. As a result, the flexible buffer control is attained and the need for software-based exclusive control can be eliminated, thereby reducing overhead.

In the present invention, the entire message body is written into the memory 19 of the receiving processor element 1b by the remote write unit 11 of the transmitting processor element 1a. It is also possible, however, to cause the remote write unit 11 to write a portion of the message body, the message body and a portion of the message identifier information, or a portion of the message body and a portion of the message identifier information, into the memory 19 of the receiving processor element 1b.

When a portion of the message body is remote-written into the memory 19, the transmitting processor element 1a sends to the message receiving unit 14 message identifier information, the remainder of the message body, and pointer information for the portion of the message body. When the message body and a portion of message identifier information are remote-written, the remainder of the message identifier information and pointer information for the message body and the portion of the message identifier information, are transmitted to the message receiving unit 14. For the remote-writing of a portion of the message body and a portion of the message identifier information, the remainder of the message body, the remainder of the message identifier information, and pointer information for the portion of the message body and the portion of the message identifier information, are sent to the message receiving unit 14.

If, in the present invention, the message body can be partitioned into portions for separate transmission, each of the portions of the message body can be transmitted without a header, thereby permitting high-speed message transmission and flexible high-speed data processing at the receiving end.

For example, the transmitting processor element 1a partitions the message body into portions in parallel with making message body by the message creating unit 16, and then writes each of the portions of the message body into the shared memory area in the memory 19 of the receiving processor element 1b in sequence by the remote write unit 11. Finally, the transmitting processor element 1a sends message identifier information and pointer information for the message body to the message receiving unit 14 of the receiving processor element 1b. Thus, according to the present invention, the message creation processing and the message transmission processing can be performed concurrently, thereby realizing high-speed message communications.

If, in the partitioned message body transmission described above, the receiving processor element 1b can determine whether or not the portions of the message body have arrived, then the transmitting processor element 1a may transmit to the message receiving unit 14 of the receiving processor element 1b message identifier information and pointer information for the message body, prior to actual transmission of the message body. In this case, it becomes possible to refer to the partitioned portions of the message body simultaneously upon their arrival, thereby realizing faster message processing.

Next, referring to FIG. 4, specific arrangement of the processor elements in the present embodiment will be described.

Figure 4:
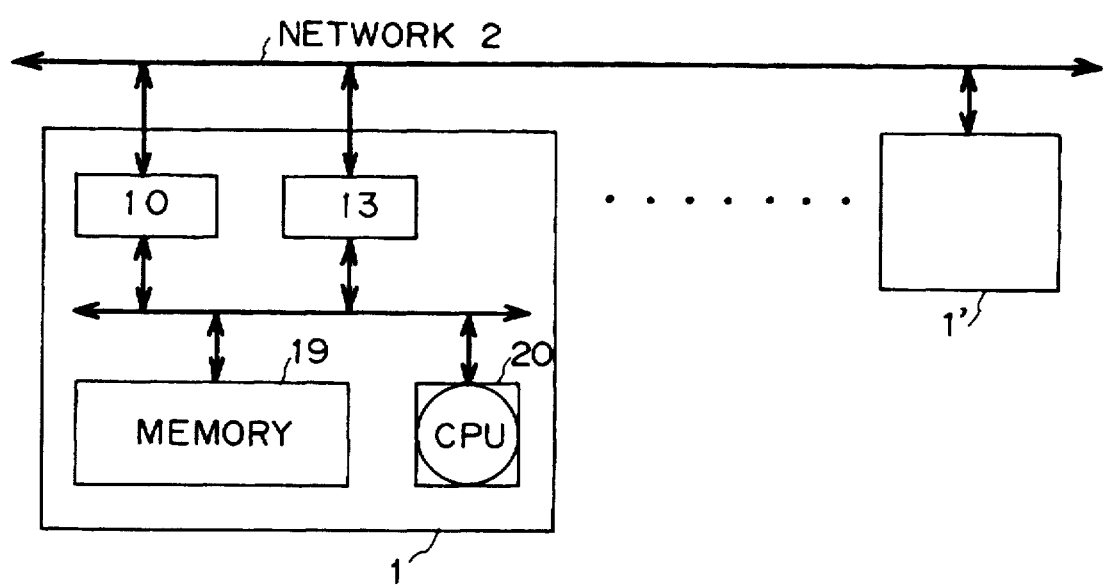
FIG. 4 shows a configuration of a processor element in the parallel computer of the present invention.

As shown in FIG. 4, the multiple processor elements 1 in the present embodiment are networked together by means of the connection path 2. Each of the processor elements 1 is equipped with a CPU 20, memory 19, message communications circuit 13, and remote memory controller 10. A portion of the memory 19 functions as a distributed shared memory accessible by other processor elements 1', and the remaining portion of the memory 19 functions as a local memory that is inaccessible by the other processor elements 1'.

The message communications circuit 13, which is realized by hardware, writes message headers sent from the other processor elements 1' into the shared memory area or the local memory area in the memory 19 of the processor element 1, in the order in which they are received. The message communications circuit 13 also transmits message headers to the message communications circuits of the other processor elements 1'.

The remote memory controller 10, which is equipped with a data register, an address register, and a data conversion circuit, receives message data and address data issued by software running in the CPU 20 at the data register and the address register, respectively, and then merges the received message data and address data for transmission to another processor element 1' over the connection path 2. The message data thus transmitted are written into the shared memory area in the memory of the other processor element specified by the transmitted address data. The remote memory controller 10 also receives message data and address data sent from other processor elements 1' and writes the message data into the shared memory area in the memory 19 specified by the received address data.

Figure 5:
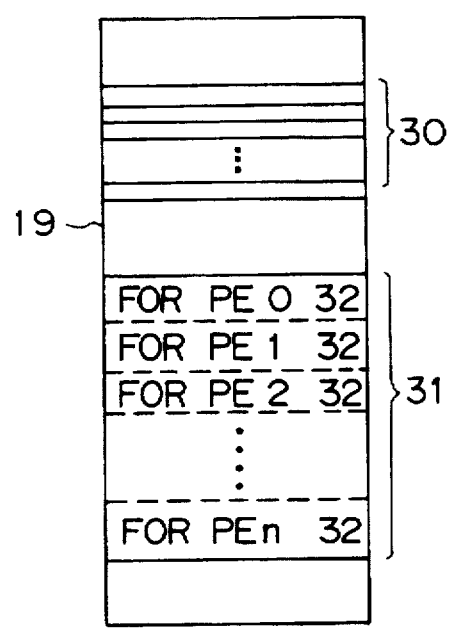
FIG. 5 shows a configuration of the memory in the parallel computer of the present invention.
Figure 6:
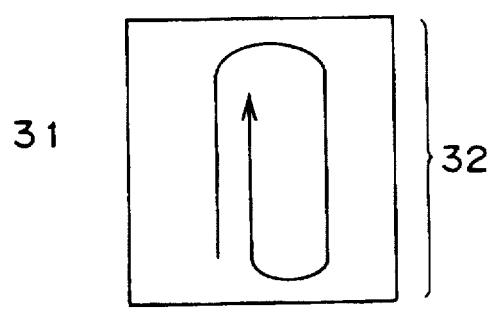
FIG. 6 shows a writing form of the memory in the processor element of the present invention.

As shown in FIG. 5, the memory 19 includes a local memory area 30 into which the message communications circuit 13 writes received headers in the order in which they are received, and a shared memory area 31 having a plurality of write areas 32 each provided for a respective one of the other processor elements PE0 to PEn. Each of the write areas 32 in the shared memory area 31 is written with message data received by the remote memory controller 10 in a ring form such as shown in FIG. 6. Each of the write areas 32 is created or deleted according to a request from a corresponding transmitting processor element.

Next, the flow of messages in the present embodiment will be described in conjunction with FIG. 7.

Figure 7:
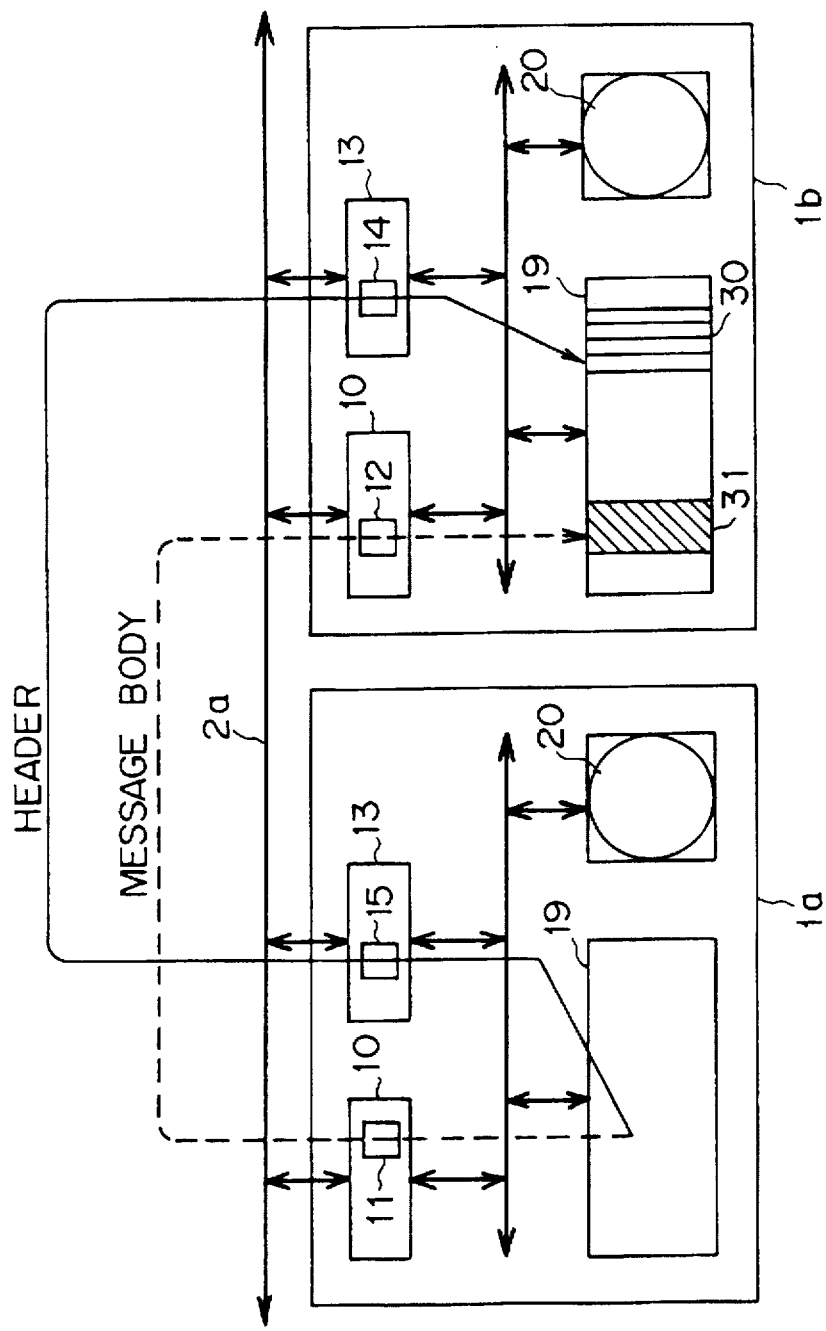
FIG. 7 shows message communications by the parallel computer of the present invention.

The transmitting processor element 1a creates a message to be transmitted and then writes the message body into the shared memory area 31 in the memory 19 of the receiving processor element 1b by the remote write unit 11 in the remote memory controller 10, as shown by a broken line in FIG. 7. Further, the transmitting processor element 1a allows its message transmitting unit 15 to send a header containing message identifier information and pointer information for the transmitted message body to the message receiving unit 14 in the message communications circuit 13 of the receiving processor element 1b, as shown by a solid line.

In this method, according to the message communication in the parallel computer of the present invention, message bodies are directly written into the shared memory area 31 in the memory 19 of the receiving processor element 1b one after another. On the other hand, the headers of the messages are sent to the message receiving unit 14 in the receiving processor element 1b and then written into the local memory area 30 in the memory 19 in the order in which they are received by the message communications circuit 13. The storage of headers including message pointer information in the order of their arrival results in allowing the sequence of message bodies to be preserved.

As described above, message bodies are written in a ring form with each of the sub-areas in the shared memory area 31 in the memory 19 allocated to a respective one of processor elements used as a ring buffer, thus reducing overhead in message communications. Since the headers, which are stored exclusively in the local memory area 30 in the memory 19 of the receiving processor element, require a very small amount of data in comparison with the message bodies, overhead in header receiving is very small.

Figure 8:
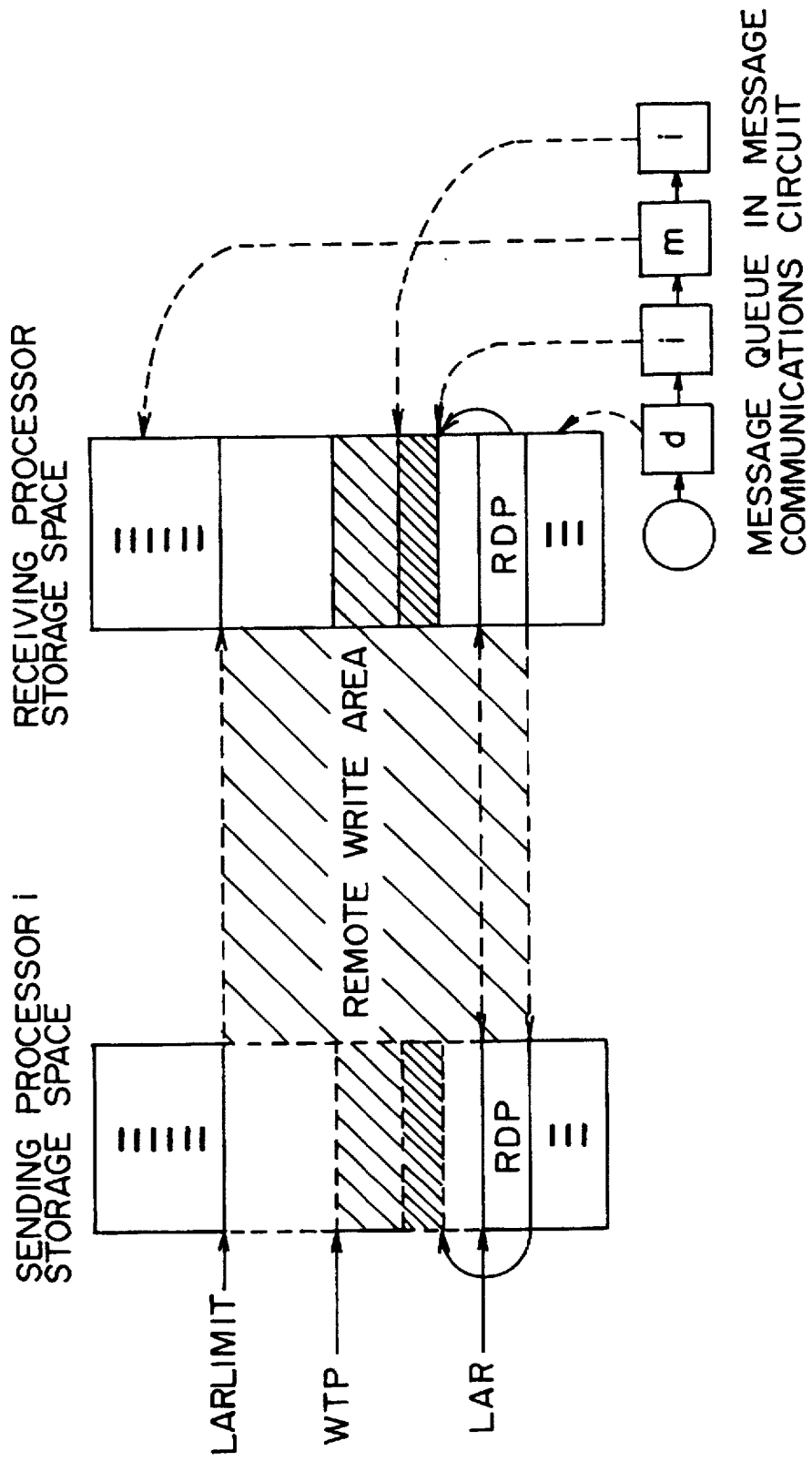
FIG. 8 shows message communications by the parallel computer of the present invention.

Hereinafter, details of message communications processing according to the present invention will be described in conjunction with FIG. 8.

The transmitting processor element 1a first reserves a write area for a message body in the shared write area 31 in the receiving processor element 1b. In this case, the write area may be reserved dynamically or statically. After reserving the write area, the transmitting processor element 1a allocates the starting address of the reserved write area to a local variable LAR and allocates the ending address to a local variable LARLIMIT. Next, the transmitting processor element 1a allocates the starting address of the reserved write area to a variable WTP indicating the starting location of the current write processing, and the receiving processor element 1b reads the variable WTP.

Next, the transmitting processor element 1a reserves an area corresponding to the length of a message body to be transmitted within the write area reserved in the memory 19 of the receiving processor element 1b, and then remote-writes that message body into the allocated area. On termination of the remote-writing, the transmitting processor element 1a allocates the ending address of the message body thus transmitted to the variable WTP.

Finally, the transmitting processor element 1a sends a header comprising message identifier information and pointer information for the transmitted message body to the message receiving unit 14 of the receiving processor element 1b, thereby terminating the message transmission.

On the other hand, upon receipt of a request to reserve a message body write area from the transmitting processor element 1a, the receiving processor element 1b reserves a write area corresponding to specified storage capacity in the shared memory area 31. Next, the receiving processor element 1b informs the transmitting processor element of the starting and ending addresses of the reserved write area, and allocates the starting address to a variable RDP in the transmitting processor element, which indicates the point of completion of reading of data.

Next, upon receipt of a message body and header from the transmitting processor element 1a, the receiving processor element 1b writes into the local memory area 30 in the memory 19, message body, identifier information and pointer information for the message body included in the header sent to its message communications circuit 13, in the order in which they are received. Thus, the identifier information and the pointer information are in a queuing state.

After that, upon receiving a read request of a message in another processor element from a data processing program running in its CPU 20, the receiving processor element 1b refers to queuing data in the local memory area 30 to check whether message identifier information indicating an message requested is queuing. When the message identifier information is queuing, the message body which has been written into the shared memory area 31 is specified in accordance with the pointer information corresponding to the identifier information and then copied into the user receive area. Then, the ending address of the message body is allocated to the variable RDP.

Thus, according to the present invention, message bodies are directly written into the shared memory area 31 in the memory 19, and their sequence is retained by based on the order of the arrival of the identifier information which requires less data. When a message body written in the memory area is needed, the message body is specified by identifier information and then read out by pointer information corresponding to the identifier information.

Next, the buffer control in the processor elements 1 will be described.

The transmitting processor element 1a remote-writes the message body into the shared memory area 31 in the receiving processor element 1b, for example, in a ring form. At this point, the message body is written into the shared memory area 31 in which the starting point is shown by the address indicated by the variable WTP. When the sum of the address indicated by the variable WTP and the size of message bodies to be transmitted exceeds the address indicated by the local variable LARLIMIT, after writing in the address indicated by the variable WTP a message indicating that the message size exceeds the limit value, the message body is written into the area starting at the address indicated by the local variable LAR, which indicates the beginning of the ring buffer, after the address indicated by the local variable LARLIMIT is reached.

When the variable WTP, which indicates the starting location for writing by the transmitting processor element 1a, makes a round and is going to exceed the variable RDP, which indicates an address at which the receiving processor element 1b is reading into, it becomes necessary to reserve a new write area in the memory 19 in the receiving processor element 1b. In this case, the transmitting processor element 1a sends to the receiving processor element 1b a release requesting message for releasing a previously used write area. In response to this request, the receiving processor element 1b reserves a new write area, and then sends to the transmitting processor element 1a a message indicating that the new write area has been reserved.

In the present embodiment, the message body and the header are transmitted separately. If a message body can be partitioned into portions, therefore, each of the portions can be sent separately, which is very advantageous. This message partitioned transmission will be described hereinafter with reference to FIGS. 9A, 9B, 10A and 10B.

In the parallel computer, the transmitting processor element 1a performs various calculations on data and sends the results to the receiving processor element 1b as a message. Upon receipt of the message, the receiving processor element determines that the message is a desired message, and then continues further calculations using the message. In such message processing, the entire message is not normally created at one time, but is in time sequence.

Figure 9A:
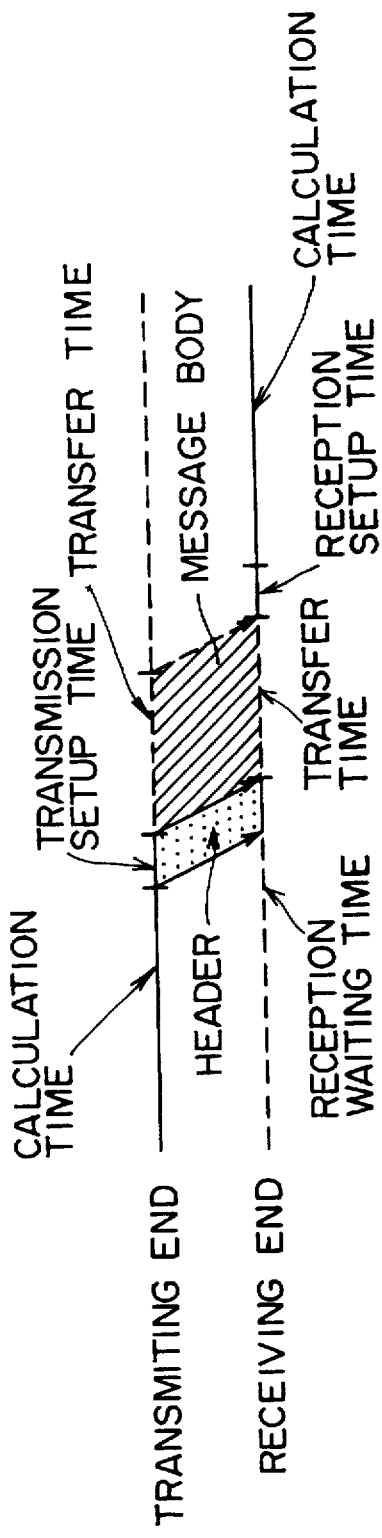
FIGS. 9A and 9B are diagrams for use in explanation of a conventional message communications method.
Figure 9B:
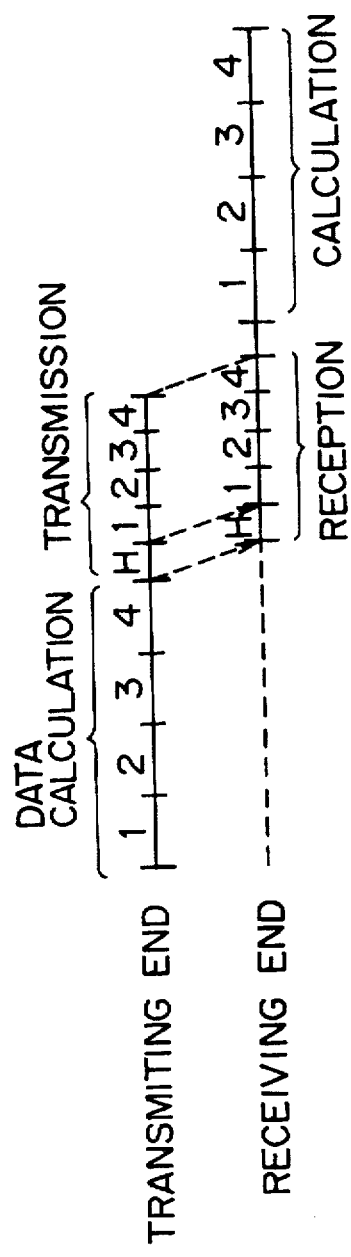

In conventional parallel computers, as shown in FIGS. 9A and 9B, a header must be attached to a message in its entirety before the message is transmitted. Even if data ready for transmission (for example, data 1 or 2 in FIG. 9B) has been created, therefore, they cannot be transmitted until all the message has been created. Correspondingly the receiving processor element 1b is not permitted to start message calculations until the entire message is received. In the parallel computer according to the present invention, as shown in FIG. 10A, the transmitting processor element 1a is permitted to write message portions already created into the shared memory area 31 of the receiving processor element 1b concurrently with message creation. For example, data 1, which is already created, is transmitted while data 2 is created as shown FIG. 10A. Finally, a header for the transmitted message is sent to the message communications circuit 13 of the receiving processor element 1b. Thus, the present invention permits the message creation and the message communication to be performed concurrently, thereby achieving a reduction in message processing time.

If the receiving processor element is able to know the arrival of a message by the message itself, then much faster message processing can be performed. If, for example, the contents of a message are surely present and not zero, then the receiving processor element can read the received message to know of its arrival. In such a case, as shown in FIG. 10B, the transmitting processor element sends the header for the message to the message communications circuit 13 of the receiving processor element prior to the transmission of the message. After that, while creating the message, the transmitting processor element 1a writes message portions already created in sequence into the shared memory area 31 of the receiving processor element 1b. Thus, the present invention can achieve a further reduction in the message processing time by sending a header prior to a message body.

FIGS. 10A and 10B show an example of message processing in which no acknowledgment is required for the remote writing in of a message. It should be noted, however, that the present invention is also applicable to message processing in which acknowledgment is required.

With partitioned transmission of a message, it is also possible to attach a header to each of portions of the message for transmission. In this case, however, searching for message portions, resequencing message portions, reconstructing the message, copying the message, and the like, are required, and the overhead is increased.

The present invention has been described in terms of the preferred embodiment, however the present invention is not limited to this embodiment. For example, the transmitting processor element 1a may transmit a portion of a message body, a message body and a portion of message identifier information, or a portion of a message body and a portion of message identifier information, to the receive write unit 12 the receiving processor element 1b.

When a portion of a message body is transmitted, the transmitting processor element 1a transmits to the message receiving unit 14 of the message communications circuit 13 message identifier information, the remaining portion of the message body, and pointer information for the portion of the message body. When a message body and a portion of message identifier information are transmitted, the remaining portion of the message identifier information and pointer information for the message body and the portion of the message identifier information are sent to the message receiving unit 14. When a portion of a message body and a portion of message identifier information, are transmitted, the remaining portion of the message body, the remaining portion of the message identifier information, and pointer information for the portion of the message body and the portion of the message identifier information, are sent to the message receiving unit 14.

The communications method in which a portion of a message body is remote-written is advantageous when the use of the message communications circuit 13 permits faster message communications than the use of the remote memory controller 10. The method of remote-writing the message body and a portion of message identifier information is advantageous when the use of the remote memory controller 10 permits faster message communications than the use of the message communications circuit 13.

In the present embodiment, a message body is remote written by the remote memory controller 10. When the message is shorter than a specified length, a message body and message identifier information may be transmitted to the message communications circuit 13, without using the remote memory controller 10. This method is especially effective where the use of the message communications circuit 13 permits faster message communications than the use of the remote memory controller 10.

Although, in the present embodiment, each processor element is equipped with the memory 19 positioned locally, this is not restrictive. In addition to, or instead of the memory 19, a shared memory that is not positioned locally may be used.

What is claimed is:

1. A method for message communications between multiple processor elements in a parallel computer, comprising the steps of:

directly writing a message body comprising message information of a message from a transmitting processor element into a shared memory area in a memory of a receiving processor element by remote writing means;

transmitting a header separate from the message body comprising identifier information and pointer information for said message from said transmitting processor element to message receiving means of said receiving processor element; and writing said header into a local memory area in said memory in the order of arrival of headers by said message receiving means of said receiving processor element.

2. The method according to claim 1, wherein said header is transmitted to said message receiving means before said message body is transmitted to said receiving processor element.

3. A method for message communications between multiple processor elements in a parallel computer, comprising the steps of:

directly writing a message body comprising message information of a message from a transmitting processor element into a shared memory area in a memory of a receiving processor element by remote writing means;

transmitting a header comprising identifier information and pointer information for said message from said transmitting processor element to message receiving means of said receiving processor element; and writing said header into a local memory area in said memory in the order of arrival of headers by said message receiving means of said receiving processor element, wherein said message body is created in said transmitting processor element such that said message body is partitioned into a plurality of portions.

4. A method for message communications between multiple processor elements in a parallel computer, comprising the steps of:

directly writing a message body comprising message information of a message from a transmitting processor element into a shared memory area in a memory of a receiving processor element by remote writing means, wherein said message body is created in said transmitting processor element such that said message body is partitioned into a plurality of portions;

transmitting a header comprising identifier information and pointer information for said message from said transmitting processor element to message receiving means of said receiving processor element; and writing said header into a local memory area in said memory in the order of arrival of headers by said message receiving means of said receiving processor element, wherein said transmitting processor element transmits a portion of said message body to said receiving processor element while creating another portion of said message body.

5. A method for message communications between multiple processor elements in a parallel computer, comprising the steps of:

directly writing a message body comprising message information of a message from a transmitting processor element into a shared memory area in a memory of a receiving processor element by remote writing means;

transmitting a header comprising identifier information and pointer information for said message from said transmitting processor element to message receiving means of said receiving processor element; and writing said header into a local memory area in said memory in the order of arrival of headers by said message receiving means of said receiving processor element, wherein when said message is shorter than a prescribed length, said transmitting processor element transmits said message body and said identifier information to said message receiving means of said receiving processor element.

6. A method for message communications between multiple processor elements in a parallel computer, comprising the steps of:

directly writing a message body comprising message information of a message from a transmitting processor element into a shared memory area in a memory of a receiving processor element by remote writing means;

transmitting a header comprising identifier information and pointer information for said message from said transmitting processor element to message receiving means of said receiving processor element; and writing said header into a local memory area in said memory in the order of arrival of headers by said message receiving means of said receiving processor element, wherein said transmitting processor element writes a portion of said message body into said shared memory area, and transmits said identifier information, the remaining portion of said message body, and pointer information for said portion of said message body to said message receiving means.

7. A method for message communications between multiple processor elements in a parallel computer, comprising the steps of:

directly writing a message body comprising message information of a message from a transmitting processor element into a shared memory area in a memory of a receiving processor element by remote writing means;

transmitting a header comprising identifier information and pointer information for said message from said transmitting processor element to message receiving means of said receiving processor element; and writing said header into a local memory area in said memory in the order of arrival of headers by said message receiving means of said receiving processor element, wherein said transmitting processor element writes said message body and a portion of said identifier information into said shared memory area, and transmits a remaining portion of said identifier information and pointer information for said message body and said portion of said identifier information to said message receiving means.

8. A method for message communications between multiple processor elements in a parallel computer, comprising the steps of:

directly writing a message body comprising message information of a message from a transmitting processor element into a shared memory area in a memory of a receiving processor element by remote writing means, transmitting a header comprising identifier information and pointer information for said message from said transmitting processor element to message receiving means of said receiving processor element; and writing said header into a local memory area in said memory in the order of arrival of headers by said message receiving means of said receiving processor element, wherein said transmitting processor element writes a portion of said message body and a portion of said identifier information into said shared memory area, and transmits the remaining portion of said message body, a remaining portion of said identifier information, and pointer information for said message body and said portion of said identifier information to said message receiving means.

9. A method for message communications between multiple processor elements in a parallel computer, comprising the steps of:

directly writing a message body comprising message information of a message from a transmitting processor element into a shared memory area in a memory of a receiving processor element by remote writing means;

transmitting a header comprising identifier information and pointer information for said message from said transmitting processor element to message receiving means of said receiving processor element; and writing said header into a local memory area in said memory in the order of arrival of headers by said message receiving means of said receiving processor element, wherein when said transmitting processor element writes said message body into said shared memory area in said memory of said receiving processor element by said remote writing means, and said transmitting processor element specifies a write area allocated to said transmitting processor element to write said message body.

10. A method for message communications between multiple processor elements in a parallel computer, comprising the steps of:

directly writing a message body comprising message information of a message from a transmitting processor element into a shared memory area in a memory of a receiving processor element by remote writing means;

transmitting a header comprising identifier information and pointer information for said message from said transmitting processor element to message receiving means of said receiving processor element; and writing said header into a local memory area in said memory in the order of arrival of headers by said message receiving means of said receiving processor element, wherein a portion of said shared area in said memory of said receiving processor element allocated to said transmitting processor element is released according to a request from said transmitting processor element.

11. A method for message communications between multiple processor elements in a parallel computer, comprising the steps of:

directly writing a message body comprising message information of a message from a transmitting processor element into a shared memory area in a memory of a receiving processor element by remote writing means;

transmitting a header comprising identifier information and pointer information for said message from said transmitting processor element to message receiving means of said receiving processor element; and writing said header into a local memory area in said memory in the order of arrival of headers by said message receiving means of said receiving processor element, wherein when a portion of said shared area in said memory of said receiving processor element allocated to said transmitting processor element becomes full, another portion allocated to said transmitting processor element is newly generated in said shared memory area according to a request from said transmitting processor element.

12. A parallel computer in which message communications are performed between multiple processor elements, comprising:

one of the multiple processor elements comprising:
remote writing means directly writing a message body comprising message information of a message into a shared memory area in a memory of another of the multiple processor elements, and
message transmitting means for transmitting a header comprising identifier information and pointer information for said message to said another of the multiple processor elements; and said another of the multiple processor elements comprising:
said memory comprising:
said shared memory area,
a local memory area, and
message receiving means for writing said header sent from said one of the multiple processor elements in said local memory area in said memory in order of arrival of headers.

13. The parallel computer according to claim 12, wherein, in said one of the multiple processor elements, said message body is created such that said message body is partitioned into a plurality of portions, and said remote writing means writes said portions of said message body into said shared memory area in said memory.

14. The parallel computer according to claim 12, wherein said message transmitting means transmits said header to said message receiving means of said another of the multiple processor elements prior to transmission of said message body.

15. A parallel computer in which message communications are performed between multiple processor elements, comprising:

one of the multiple processor elements comprising:
remote writing means directly writing a message body comprising message information of a message into a shared memory area in a memory of another of the multiple processor elements, and
message transmitting means for transmitting a header comprising identifier information and pointer information for said message to said another of the multiple processor elements; and said another of the multiple processor elements comprising:
said memory comprising:
said shared memory area,
a local memory area, and
message receiving means for writing said header sent from said one of the multiple processor elements in said local memory area in said memory in order of arrival of headers, wherein said one of the multiple processor elements transmits a portion of said message body to said shared memory area in said memory while creating another portion of said message body.

16. A parallel computer in which message communications are performed between multiple processor elements, comprising:

one of the multiple processor elements comprising:
remote writing means directly writing a message body comprising message information of a message into a shared memory area in a memory of another of the multiple processor elements, and
message transmitting means for transmitting a header comprising identifier information and pointer information for said message to said another of the multiple processor elements; and said another of the multiple processor elements comprising:
said memory comprising:
said shared memory area,
a local memory area, and
message receiving means for writing said header sent from said one of the multiple processor elements in said local memory area in said memory in order of arrival of headers, wherein when said message is shorter than a prescribed length, said one of the multiple processor elements transmits said message body and said identifier information to said message receiving means of said another of the multiple processor elements.

17. A parallel computer in which message communications are performed between multiple processor elements, comprising:

one of the multiple processor elements comprising:
remote writing means directly writing a message body comprising message information of a message into a shared memory area in a memory of another of the multiple processor elements, and
message transmitting means for transmitting a header comprising identifier information and pointer information for said message to said another of the multiple processor elements; and said another of the multiple processor elements comprising:
said memory comprising:
said shared memory area,
a local memory area, and
message receiving means for writing said header sent from said one of the multiple processor elements in said local memory area in said memory in order of arrival of headers, wherein said processor element writes a portion of said message body into said shared memory area in said another of the multiple processor elements, and transmits said identifier information, the remaining portion of said message body, and pointer information for said portion of said message body to said message receiving means of said another of the multiple processor elements.

18. A parallel computer in which message communications are performed between multiple processor elements, comprising:

one of the multiple processor elements comprising:
remote writing means directly writing a message body comprising message information of a message into a shared memory area in a memory of another of the multiple processor elements, and message transmitting means for transmitting a header comprising identifier information and pointer information for said message to said another of the multiple processor elements; and said another of the multiple processor elements comprising:

said memory comprising:

said shared memory area, a local memory area, and message receiving means for writing said header sent from said one of the multiple processor elements in said local memory area in said memory in order of arrival of headers, wherein said one of the multiple processor elements writes said message body and a portion of said identifier information into said shared memory area of said another of the multiple processor elements, and transmits a remaining portion of said identifier information and pointer information for said message body and said portion of said identifier information to said message receiving means of said another of the multiple processor elements.

19. A parallel computer in which message communications are performed between multiple processor elements, comprising:

one of the multiple processor elements comprising:

remote writing means directly writing a message body comprising message information of a message into a shared memory area in a memory of another of the multiple processor elements, and message transmitting means for transmitting a header comprising identifier information and pointer information for said message to said another of the multiple processor elements; and said another of the multiple processor elements comprising:

said memory comprising:

said shared memory area, a local memory area, and message receiving means for writing said header sent from said one of the multiple processor elements in said local memory area in said memory in order of arrival of headers, wherein said one of the multiple processor elements writes a portion of said message body and a portion of said identifier information into said shared memory area, and transmits the remaining portion of said message body, the remaining portion of said identifier information and pointer information for said portion of said message body and said portion of said identifier information to said message receiving means.

20. A parallel computer in which message communications are performed between multiple processor elements, comprising:

one of the multiple processor elements comprising:

remote writing means directly writing a message body comprising message information of a message into a shared memory area in a memory of another of the multiple processor elements, and message transmitting means for transmitting a header comprising identifier information and pointer information for said message to said another of the multiple processor elements; and said another of the multiple processor elements comprising:

said memory comprising:

said shared memory area, a local memory area, and message receiving means for writing said header sent from said one of the multiple processor elements in said local memory area in said memory in order of arrival of headers, wherein when said one of the multiple processor elements writes said message body into said shared memory area in said memory by said remote writing means, said one of the multiple processor element specifies a write area allocated to said one of the multiple processor elements to write said message body.

21. A parallel computer in which message communications are performed between multiple processor elements, comprising:

one of the multiple processor elements comprising:

remote writing means directly writing a message body comprising message information of a message into a shared memory area in a memory of another of the multiple processor elements, and message transmitting means for transmitting a header comprising identifier information and pointer information for said message to said another of the multiple processor elements; and said another of the multiple processor elements comprising:

said memory comprising:

said shared memory area, a local memory area, and message receiving means for writing said header sent from said one of the multiple processor elements in said local memory area in said memory in order of arrival of headers, and releasing means for releasing a portion in said shared memory area allocated to said one of the multiple processor elements, according to a request from said one of the multiple processor elements.

22. A parallel computer in which message communications are performed between multiple processor elements, comprising:

one of the multiple processor elements comprising:

remote writing means directly writing a message body comprising message information of a message into a shared memory area in a memory of another of the multiple processor elements, and message transmitting means for transmitting a header comprising identifier information and pointer information for said message to said another of the multiple processor elements; and said another of the multiple processor elements comprising:

said memory comprising:

said shared memory area, a local memory area, and message receiving means for writing said header sent from said one of the multiple processor elements in said local memory area in said memory in order of arrival of headers, and means for generating a new area allocated to said one of the multiple processor elements in said shared memory, according to a request from said one of the multiple processor elements when an area in said shared memory area allocated to said one of the multiple processor elements becomes full.

23. A parallel computer in which message communications are performed between multiple processor elements, comprising:

a shared memory;

a first processor element comprising:

remote writing means directly writing a message body comprising message information of a message into the shared memory, and message transmitting means for transmitting a header separate from said message body comprising identifier information and pointer information for said message to a second processor element; and said second processor element comprising:

a local memory, and message receiving means for writing said header sent from said first processor element in said local memory in order of the arrival of the header.

* * * * *